UNITED STATES PATENT OFFICE.

CHARLES A. CATLIN, OF PROVIDENCE, RHODE ISLAND.

IMPROVEMENT IN PRESERVING MILK.

Specification forming part of Letters Patent No. 214,189, dated April 22, 1879; application filed February 11, 1879.

*To all whom it may concern:*

Be it known that I, CHARLES A. CATLIN, of Providence, in the county of Providence and State of Rhode Island, have invented a new and useful Improvement in the Preservation of Milk, and production of the same in dry pulverulent form, which improvement is fully set forth in the following specification.

The object of my invention is to produce concentrated milk in the state of a dry powder, which shall preserve all its valuable properties for any desired time, and be readily available for all purposes for which milk is used.

Concentrated milk is now produced by evaporating a mixture of milk and sugar to a thick fluid, and for preservation it is packed in hermetically-sealed vessels. It has the disagreeable taste of boiled milk, and contains by addition a large amount of sugar, and rapidly deteriorates when exposed to the air. The product of my process has not the objectionable boiled taste. It contains but an infinitesimal amount of foreign matter. It is a dry powder, not affected by ordinary atmospheric conditions, and may be kept in loose packages.

My process is as follows: I moisten any suitable absorbing powder, such as starch, dextrine, sugar, or indeed any harmless absorbing medium, with a quantity of fresh milk, sufficient to produce a friable mass, not agglutinated, but susceptible of being readily crumbled into granules, to better expose it to the influence of a current of cool dry air, to which I now expose it. By cool dry air I mean air at a temperature below that at which milk is liable to undergo deterioration or change—say, therefore, below 60°, or between 40° and 60°, Fahrenheit. In this manner it readily dries when spread in thin layers. When it is dried, if necessary, I again reduce it to a powder, and again moisten it, in the manner above described, with more fresh milk, and again dry it, and so on, powdering, moistening, and drying, the dried powder of a previous process furnishing the absorbent for each fresh addition of milk.

To render the dried milk more readily soluble, if desired, I add in the process a small amount of carbonate of an alkali, and, if thought desirable, a small amount of common salt, borax, or other preservative may be added; but for ordinary purposes I have found these unnecessary.

The following description will serve to more fully illustrate my process.

Starting out with a regular supply of milk night and morning, I use such a quantity of absorbent as when moistened with the quantity of milk received, say, in the morning, and dried, shall produce the desired friable mass. I subject the moistened mass to the action of currents of air; and before the evening supply of milk is received it is dried, and after being powdered is ready to act as an absorbent for that supply, with which it is moistened. This in turn before the next morning is ready to play the part of absorbent again, and so on. The process is continued night and day.

Any kind of apparatus for cooling air or of forcing or passing the same over or through the milk imbued or coated mass may be used, and needs not particular description here, as such is well known and in common use; but I have used an apparatus specially adapted for the purpose, and which is the subject-matter of a pending application for separate Letters Patent.

The product after a time will be found to contain only a trace of the original absorbent, and each day a portion may be taken from it equal to the daily increase in weight, and this when ground and packed is ready for the market.

For effecting the pulverizing, any ordinary or suitable means may be employed. I do not intend to limit my invention to any particular form of apparatus.

Having thus described my invention and the manner in which the same is or may be carried into effect, what I claim, and desire to secure by Letters Patent, is—

1. The method of preserving milk by removing or separating its watery constituents, and converting the residue into a solid, dry, and friable substance, substantially as described.

2. The method of converting milk into a dry and solid mass, capable of reduction to powder by the initiatory use of an absorbent, and by continuing said process by means of the already-formed dry or pulverulent mass, substantially as described.

3. The herein-described new product or article of manufacture, the same being substantially milk in a dry friable form.

4. Milk powder formed at a low temperature, substantially as set forth.

In testimony whereof I have signed this specification in the presence of two subscribing witnesses.

CHAS. A. CATLIN.

Witnesses:
 WALTER B. VINCENT,
 HENRY A. GREENE.